United States Patent [19]
Mendelsohn

[11] 3,922,638
[45] Nov. 25, 1975

[54] PARKING COMPENSATOR

[76] Inventor: Jack Mendelsohn, 108-49 63rd Ave., Forest Hills, N.Y. 11375

[22] Filed: May 3, 1974

[21] Appl. No.: 466,606

[52] U.S. Cl. .................................................. 340/51
[51] Int. Cl.² ..................... G08G 1/14; G08B 21/00
[58] Field of Search ............... 340/51, 61; 200/61.4

[56] References Cited
UNITED STATES PATENTS

| | | | |
|---|---|---|---|
| 2,454,896 | 11/1948 | Traub | 340/61 |
| 2,879,350 | 3/1959 | Howell | 340/51 |
| 3,668,626 | 6/1972 | Follett | 340/51 |
| 3,820,065 | 6/1974 | Koplewicz et al. | 340/51 |

*Primary Examiner*—Donald J. Yusko
*Attorney, Agent, or Firm*—Steinberg & Blake

[57] ABSTRACT

A device which will aid a vehicle operator in parking a vehicle close to an obstacle such as a wall, column, or the like. A positioning structure positions a movable component, which is adapted to be engaged and moved by the vehicle, close to the obstacle with a first signal being provided when the movable component is moved by the vehicle through a first increment and a second signal being provided when the movable component is moved through a second increment subsequent to the first increment. In response to the first signal the operator knows that the vehicle must be brought to a stop and attempts to bring the vehicle to a stop in synchronism with the second signal, the positioning structure positioning the movable component with respect to the obstacle in such a way as to compensate for the unavoidable small extent of movement of the vehicle even after the second signal is given.

18 Claims, 11 Drawing Figures

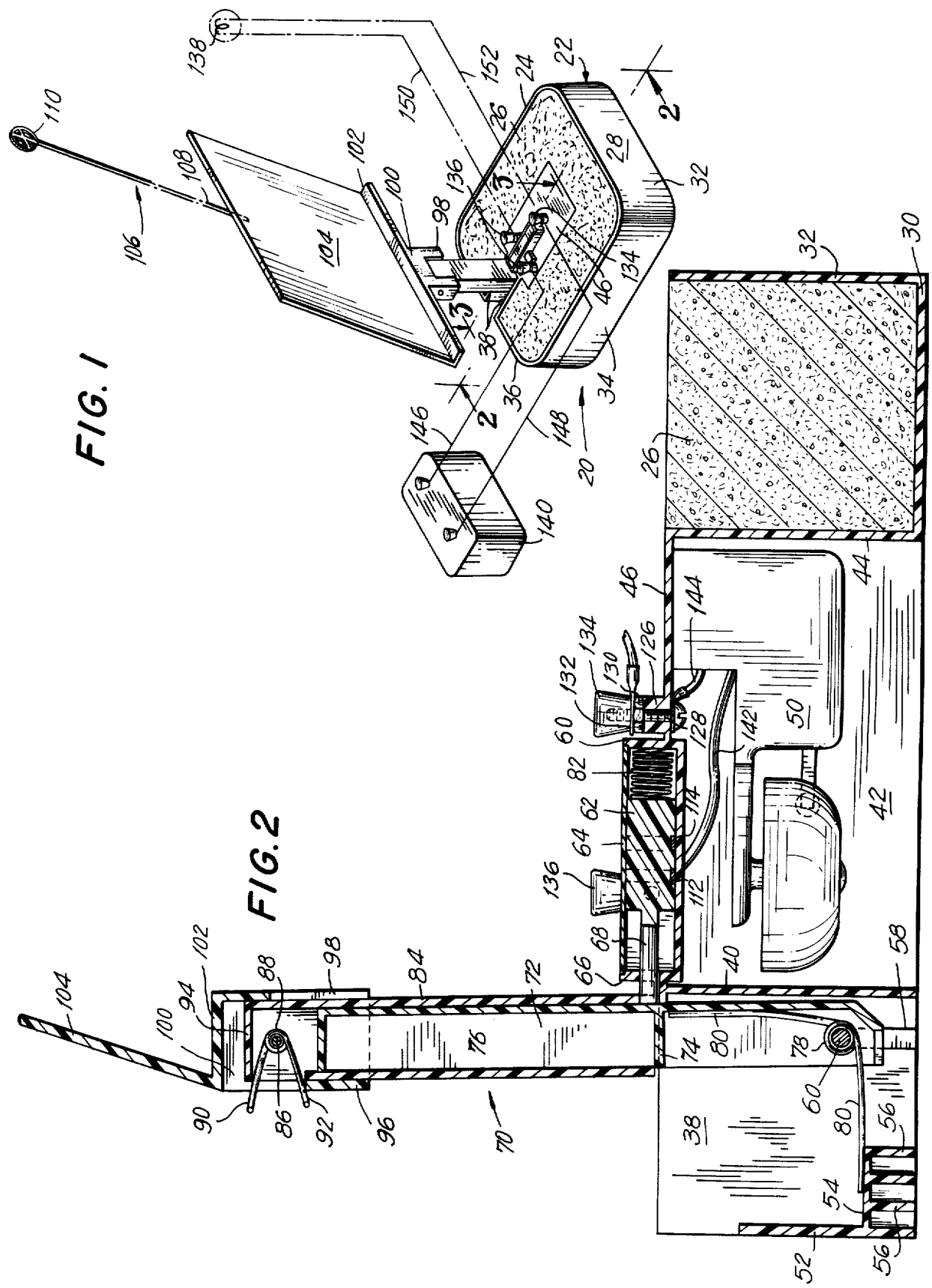

PARKING COMPENSATOR

BACKGROUND OF THE INVENTION

The present invention relates to devices for assisting a vehicle operator in parking a vehicle.

As is well known, many vehicle operators encounter difficulties in properly parking a vehicle in a precise manner. For example it is often essential for an operator to park a vehicle in a garage which provides a space which is just barely great enough to receive the vehicle, this space being limited by obstacles such as a wall of the garage or columns which are located in many garage spaces.

There are known warning devices which are capable of giving a warning when a vehicle operator causes the vehicle to approach extremely close to a given obstacle such as a wall, column, or the like. However, it has been found from experience that conventional devices of this type are incapable of enabling the operator to park the vehicle with the greatest possible precision and in a manner which will reliably avoid engagement between the vehicle and the obstacle.

The primary reason for this drawback is a failure to recognize the fact that even after an operator has completed all of the operations in connection with bringing a vehicle to a stop, the vehicle will still continue to move, although through a small distance on the order of a few inches. For example, after the brakes of a vehicle have been applied and after the gear shift lever of the vehicle has been placed in the parked position, upon release of the vehicle brake it is not uncommon for the vehicle still to move through some inches before it actually stops moving. Thus, even when a brake is fully applied and even when the vehicle is placed in the parked position, the vehicle will still move, although through a relatively small distance, and most of the difficulties encountered with conventional warning devices reside in the fact that they are not designed to take into account this small final distance of movement of the vehicle after the operator has performed all of the operations in connection with stopping of the vehicle and believes that the vehicle has been stopped.

SUMMARY OF THE INVENTION

It is accordingly a primary object of the present invention to provide a device of the above general type which will compensate for movement of the vehicle even after all operations in connection with stopping of the vehicle have been carried out by the operator.

Thus, it is an object of the present invention to provide a device which will enable an operator to locate a vehicle at an extremely small distance from a given obstacle while at the same time reliably preventing the vehicle from striking the obstacle even to a small extent.

In addition, it is an object of the present invention to provide a device of the above type which will reliably stand up under conditions of rugged use in such a way that along operating life for the device is assured.

More specifically, it is an object of the present invention to provide a device of the above type which will be capable of automatically responding to conditions which normally would break the device, to prevent damage to the device.

Furthermore it is an object of the present invention to provide a device of the above general type which can readily be located at any desired location while reliably remaining in the location which has been selected.

Furthermore it is an object of the present invention to provide a device of the above type which will enable the operator to see when the vehicle is about to engage the device of the invention.

Furthermore it is an object of the present invention to provide a device of the above type which will reliably transmit signals to the operator in connection with which the operator will know the best possible manner in which to bring the vehicle to a stop.

Furthermore it is an object of the present invention to provide a device of the type which is relatively inexpensive, capable of being made up of low-cost components which are easily assembled and which will operate reliably to achieve the desired results.

In accordance with the invention the parking compensator includes a movable means which is adapted to be moved by a vehicle as the latter approaches a given obstacle such as a wall, column, or the like. A signal means is operatively connected with the movable means to be actuated thereby for providing a first signal when the movable means is moved by the vehicle through a first increment and a second signal when the movable means is moved by the vehicle through a second increment subsequent to the first increment. A positioning means is operatively connected with the movable means for positioning the latter with respect to the obstacle in such a way that when the operator responds to the first signal he knows that he must immediately bring the vehicle to a stop and the operator attempts to actually stop the vehicle in synchronism with the second signal, the positioning means positioning the movable means with respect to the obstacle in such a way as to allow for continued movement of the vehicle through some small distance even after the second signal is given so as to compensate in this way for the unavoidable movement of the vehicle even after the operator has completed all of the operations in connection with bringing the vehicle to a stop.

BRIEF DESCRIPTION OF DRAWINGS

The invention is illustrated by way of example in the accompanying drawings which form part of this application and in which:

FIG. 1 is a perspective illustration of one embodiment of the invention, FIG. 1 showing in phantom lines a lamp which may be used with the remaining structure shown in FIG. 1;

FIG. 2 is a sectional elevation showing details of the structure of FIG. 1 at a scale which is enlarged as compared to FIG. 1, FIG. 2 being taken along line 2—2 of FIG. 1 in the direction of the arrows;

DESCRIPTION OF PREFERRED EMBODIMENTS

Figure 3:
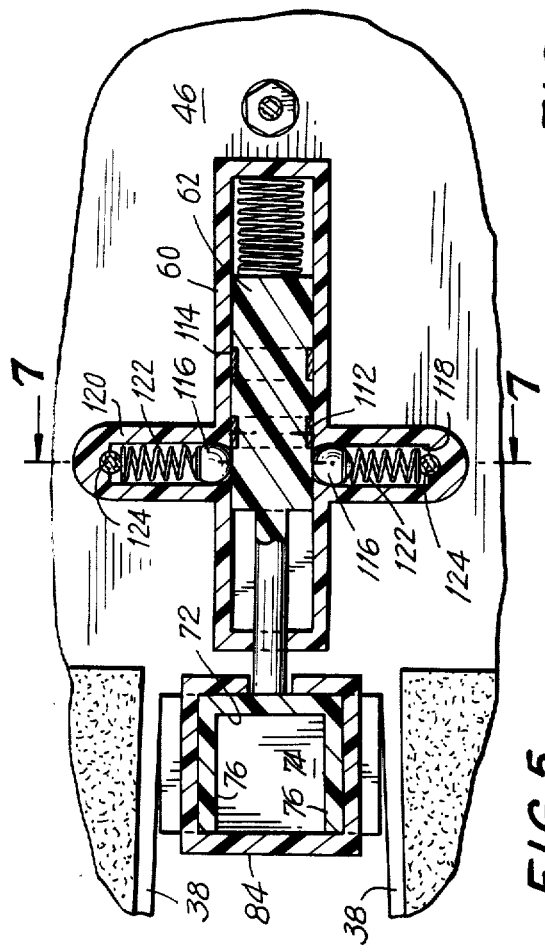
FIG. 3 is a fragmentary sectional plan view of part of the structure of FIG. 1 taken along line 3—3 of FIG. 1 in the direction of the arrows.

Referring first to FIG. 1, the device 20 of the present invention which is illustrated therein includes a positioning means 22 in the form of a relatively heavy base capable of resting on a surface which may be the surface on which a vehicle moves. The positioning means 22 includes a container 24 which contains a heavy body such as a body of concrete 26. The container 24 has an outer vertical wall 28 and a bottom wall 30 (FIG. 2). The vertical wall 28 has a front wall portion 32 and a pair of opposed side wall portions 34 extending rearwardly from the front wall portion 32 and connected with rear wall sections 36 which extend up to a pair of spaced vertical parallel wall sections 38. These parallel vertical wall sections 38 extend inwardly from the sections 36 and are substantially perpendicular thereto. At their inner ends the vertical wall sections 38 are interconnected by a transverse wall section 40. The transverse wall section 40 (FIG. 2) extends between a pair of parallel vertical wall sections 42 which are spaced from each other and which extend from the wall section 40 up to a wall section 44 which is situated behind the front wall section 32. The walls 40, 42, and 44 define an interior space which is open at the bottom and which is surrounded by the bottom wall 30. The front wall 32 together with the side walls 34 and the rear walls 36 form with the vertical wall sections 38 and the vertical wall sections 42 a space of substantially U-shaped configuration which is open at the top, and it is this space which is filled with the body of concrete 26. Thus, when the device 20 is purchased the container 24 is empty in the sense that it does not contain the concrete 26. The purchaser will mix the concrete and pour it into the container 24 so that the concrete is, for example, flush with the top edges of the outer walls 32, 34, 36, thus providing in this way the heavy base which forms the positioning means 22.

The free open interior space defined by the walls 40, 42, and 44, which is open at the bottom, is closed at the top by a wall 46 having the configuration which is most clearly apparent from FIGS. 1 and 2. Beneath this wall 46, the free space serves to accommodate a signal means which includes the electrically operable bell 50 shown in FIG. 2. This bell 50 is fixed to the wall 46 in any suitable way so that the bell 50 will have the position most clearly apparent from FIG. 2.

The rear end of the side walls 38 are interconnected by a transverse wall 52 which forms an extension of the walls 36 and which is integral with a horizontal wall 54 shown in FIG. 2, this wall extending inwardly from the wall 52 and being integral with additional vertical wall sections 56 which serve to strengthen the entire structure. The walls 38 are formed with a pair of vertically extending grooves 58, one of which is visible in FIG. 2. These grooves 58 are open at their bottom ends so that they can receive a pivot pin 60. Thus, the pivot pin 60 is capable of being inserted into the pair of grooves 58 at the bottom ends thereof with the opposed ends of the pin 60 moving to the top ends of the grooves 58.

The wall 46 which covers the space in which the bell 50 is accommodated has a portion 60 which forms an elongated guide for a plunger 62 for a purpose referred to below. Thus the portion 60 is in the form of a guide container of elongated rectangular configuration which is open at its top. The top open part of the portion 60 can be closed by a cover 64 after the plunger 62 is situated in the enclosure 60. The rear wall 66 of the enclosure 60 is formed with an opening through which an elongated free end portion 68 of the plunger 62 freely extends as illustrated in FIG. 2.

The entire container 24 described above can be molded from a suitable plastic material so as to be in one piece, and after it is filled with the concrete 26 it forms a heavy base which will reliably remain in a position on a surface where it is placed by the user.

Figure 6:
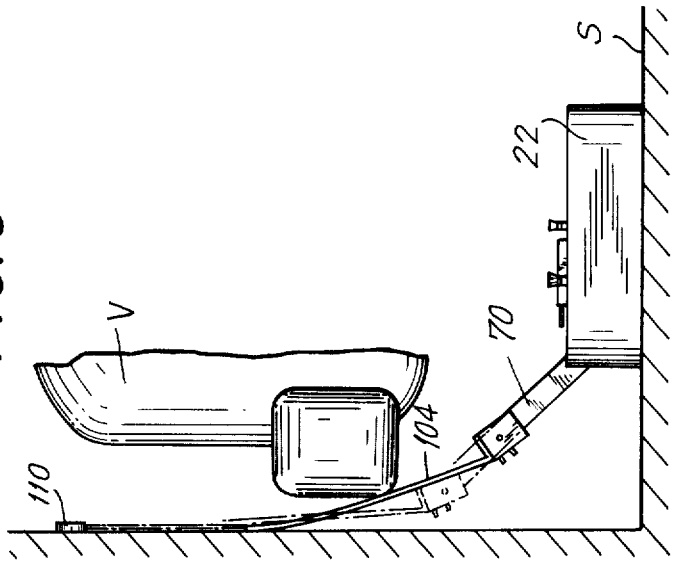
FIGS. 4–6 respectively illustrate schematically how the structure of the invention operates as a vehicle approaches an obstacle.
Figure 5:
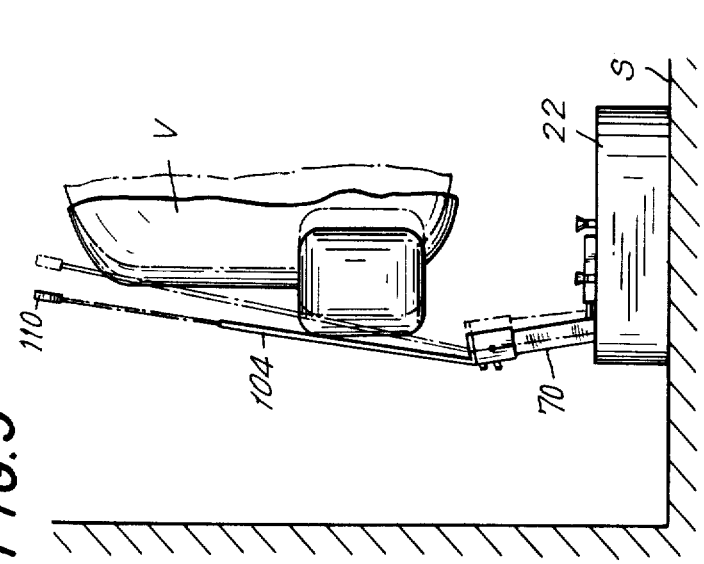
Figure 4:
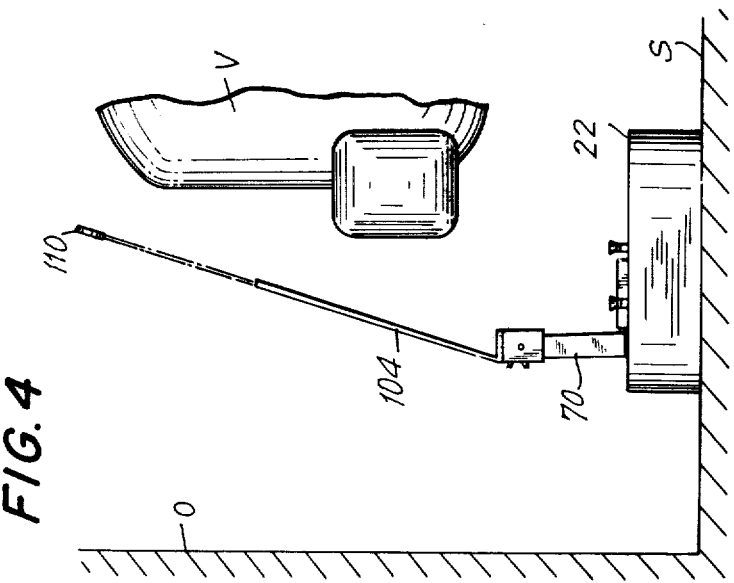

This positioning means 22 serves to support a movable means 70 for movement by a vehicle V part of which is shown in FIGS. 4–6. The movable means 70 includes an elongated lever means part of which is formed by the elongated member 72 which also is molded of plastic and which has a substantially U-shaped cross section. The member 72 has an interior reinforcing wall 74. The opposed side walls 76 of the member 72 are formed with opposed openings through which the pin 60 extends. The pin 60 which is shown in FIG. 2 is surrounded by a coil spring 78 which has elongated free ends 80 one of which engages the wall 54 and the other of which engages the rear surface of the front wall portion of the lever 70.

In order to assemble the above components the pin 60 is passed first through one opening of one of the walls 76, then through the spring 78 and then through the other opening of the other wall 76, so that in this way the spring 78, the pivot pin 60 and the member 72 are assembled together. Then the operator holds the left horizontally extending arm 80 of FIG. 2 upwardly adjacent the member 72 and introduces this entire assembly into the space behind the wall 40 passing the free ends of the pin 60 upwardly along the grooves 58. Then this left free end portion 80 of the spring 78 is released so that it presses against the wall 54 while the vertically extending arm 80 of FIG. 2 presses against the rear surface of the front wall of member 72. In this way with the components thus assembled the spring 78 urges the lever component 72 in a clockwise direction, as viewed in FIG. 2, into engagement with the rear edge of the wall 46 where this rear edge extends across the space between the pair of walls 38.

Within the enclosure 60 is a coil spring 82 which urges the plunger 62 toward the left, as viewed in FIG. 2. However the spring 78 is much stronger than the spring 82 so that in the rest position of the parts they will have the condition illustrated in FIG. 2. However it will be noted that when the lever 72 is swung in opposition to the spring 78 in a counterclockwise direction around the pin 60, as viewed in FIG. 2, the spring 82 will expand to cause the plunger 62 to follow the lever 72 with the elongated portion 68 of the plunger 62 moving through the opening in the wall 66 and remaining in engagement with the lever 72.

For a purpose which is referred to below the portion of member 72 which extends above the container 24 is received in a tubular lever portion 84 of square cross section, as is shown most clearly in FIG. 3. Thus this lever portion 84 is capable of telescopically sliding along the lever member 72 so that the lever means is capable of becoming elongated or contracted. The front wall of the tubular lever portion 84 is formed at its bottom end with a notch which receives the left free end of the portion 68 of the plunger 62. Thus, the left end of the portion 68 of the plunger 62, as viewed in FIG. 2, limits the downward movement of the tubular portion 84 along the member 72.

At its upper end, the outer telescoped lever member 84 is formed in its opposed side walls with a pair of openings through which a pivot pin 86 extends (FIG. 2). This pivot pin 86 extends through the coils of a spring 88 which has a pair of elongated free ends 90 and 92 shown in FIG. 2. The end 90 engages a top wall 94 formed at the top of the tubular member 84. The end 92 of the spring 88 engages the top edge of a transverse wall 96 which extends between a pair of opposed legs 98 of a substantially U-shaped member 100 which is integral with and extends downwardly from a bottom flange 102 which extends forwardly from the bottom edge of a plate 104 of substantially rectangular configuration which extends in a generally upright direction.

In order to assemble this part of the structure the pin 86 is first passed through an opening in one of the legs 98, then through an opening in one of the side walls of the outer tubular telescoping member 84, then through the coils of the spring 88 and then through the opening in the other side wall member 84 and finally through the other leg 98. As is apparent from FIG. 2, the spring 88 yieldably maintains the illustrated structure in the position illustrated where the transverse wall 96 engages the rear wall of the outer tubular telescoped component 84 so that the plate 104 cannot turn further in a counterclockwise direction about the pivot 86. However, it is clear from FIGS. 1 and 2 that the plate 104 together with the U-shaped member 100 can turn in a clockwise direction around the pin 86 with respect to the member 84, and such turning is provided for a purpose referred to below.

It is to be noted that the plate 104 is designed to be engaged by a part of the moving vehicle and is made of an extremely rugged plastic material which will resist breaking and this plate 104 moreover is fairly rigid so that when a part of the vehicle engages the plate 104 from the right, as viewed in FIG. 2, the plate 104 together with the entire lever assembly 72, 84 will swing as a unit about the pivot 60 in a counterclockwise direction.

As has been indicated above, the entire device shown in FIG. 1 is designed so that it can simply rest on the same surface as that on which the vehicle travels. As a result the plate 104 will be situated at a relatively low elevation. Since it may be convenient to indicate visually to the operator when a part of the vehicle is about to engage the plate 104, a means 106 is provided in order to enable such a visual indication to be given to the operator. This means 106 takes the form of an elongated relatively rigid rod 108 of a diameter smaller enough to have its bottom end received in a bore which extends inwardly into the plate 104 from the top edge thereof. This rod 108 which can have some flexibility carries at its top end an indicator 110 in the form of any flag, emblem, or the like, which can be seen by the operator over the hood of the vehicle through the front windshield thereof as the operator approaches the obstacle in a manner referred to below. Thus, through this means 106 not only is it possible for the operator to become visually aware of when the vehicle is about to engage the element 104, but in addition upon engagement of element 104 so as to swing the latter together with the rest of the movable means 70, the operator will note that the emblem or indicator 110 moves, and in this way the operator will be sure that the device of the invention is operating properly even before a signal is given in a manner described below.

In accordance with an important feature of the present invention, a signal means is operatively connected with the movable means 70 to respond to the movement thereof for providing a first signal upon movement of the movable means 70 through a first increment and a second signal upon movement of the movable means 70 through a second increment subsequent to the first increment. The signal means is electrical and includes the plunger 62 which is made of an electrically non-conductive material. As is apparent from the description above, when the movable means 70 is swung in a counterclockwise direction around the pin 60, as viewed in FIG. 2, the spring means 82 will expand maintaining the end portion 68 of the plunger 62 in engagement with the lever means 70, so that the plunger 62 moves to the left, as viewed in FIG. 2, in the interior of the receptacle 60. The signal means includes a pair of contact means one of which is carried by the positioning means 22 and the other of which is carried by the plunger 62 for providing engagement between both of these contact means first when the lever means 70 moves through the first increment and a second time when the lever means 70 moves through the second increment for providing when the pair of contact means engage each other a first signal and then a second signal, as described below. The contact means which is carried by the plunger 62 forms a movable contact means and includes a pair of electrically conductive strips 112 and 114 of substantially U-shaped configuration seated in grooves formed in the exterior surface of the plunger 62, as is apparent from FIGS. 2 and 3.

Figure 11:
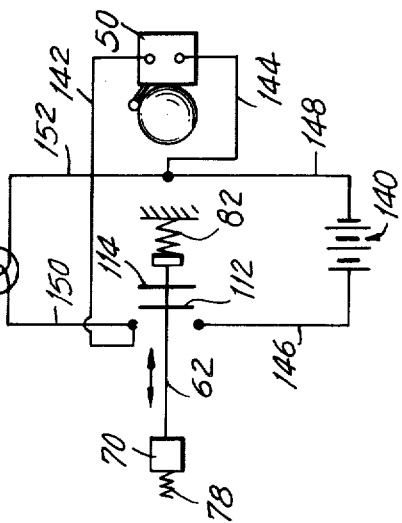
FIGS. 9–11 are respectively different wiring diagrams for the structure of the invention.
Figure 10:
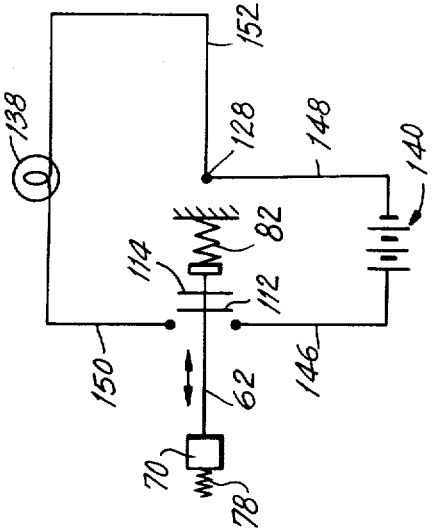

The stationary contact means which is carried by the positioning means 22 includes a pair of spring-pressed electrically conductive ball members 116 situated at the inner ends of a pair of bores 118 which are formed in a pair of lateral extensions 120 of the elongated receptacle 60. The ball members 116 are urged toward the plunger 162 (FIG. 7) by a pair of electrically conductive springs 122 situated in the bores 118, the outer ends of these springs pressing against a pair of electrically conductive screws 124 which are fixedly carried by the wall 46 which is also made of a plastic electrically non-conductive material. As is shown in FIG. 2, the wall 46 also has just in front of the receptacle 60 a boss 126 which is axially bored and which serves to carry a third electrically conductive screw 128 which is identical with the screws 124 which are mounted in the same way as the screw 128. These screws are provided with nuts 130 which serve as electrical contacts to be engaged by electrically conductive plates formed with apertures through which the screws 124 and 128 respectively extend. Thus, FIG. 2 clearly shows one of these apertured plates 132 engaging the nut 130 carried by the screw 128. A plastic electrically non-conductive nut 134 is threaded onto the top end of the screw 128 to hold the conductive plate 132 against the nut 130, and in the same way additional plastic nuts 136 are provided for the screws 124 so as to fix the electrical conductors thereto. Thus the electrically conductive plates which are connected in this way to the electrically conductive screws are situated at the ends of electrical conductors which are connected in the circuits, such as those shown in FIGS. 9–11, for the purpose of causing devices such as the bell 50 or a lamp 138 to be energized. The lamp 138 shown in FIGS. 10 and 11 is located so as to be clearly visible to the operator of the vehicle while the operator will hear the bell 50 when the latter is energized. The circuits shown in FIGS. 9–11 are energized by a battery 140, but it is to be understood that these circuits can be connected to any desired source of electricity such as a wall outlet.

Figure 9:
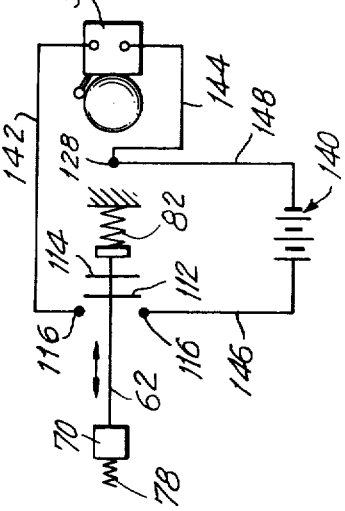

Referring to FIG. 9, one of the battery terminals is connected to one of the screws 124 so as to be electrically connected with one of the balls 116, while one of the bell terminals is connected to the other of the screws 124 so as to be electrically connected with the other of the balls 116. The remaining terminals of the battery 140 and bell 50 are both connected to the screw 128. Thus, with the circuit of FIG. 9 as the movable means 70 moves to the left, equivalent to counterclockwise swinging of the movable means 70 as viewed in FIG. 2, the contact strip 112 will first become situated between and interconnect the pair of balls 116 so as to cause the bell 50 to become energized, thus giving a signal in this way to the operator of the vehicle that it should be brought almost immediately to a stop. As the movable means 70 continues to move to the left, as viewed in FIG. 9, the contact 112 moves beyond the stationary contacts 116 to terminate the first signal and then the second contact 114 engages the stationary contacts 116 so as to provide a second signal in the same way as the first signal and when the operator hears the second signal he knows that he must have the vehicle at a stop as close as possible to the instant when the second signal is given. In practice there will still be an unavoidable continued movement of the movable means 70 with the second movable contact 114 also moving slightly beyond the stationary contacts 116 since it has been found that even if the vehicle is brought as precisely as possible to a stop when contact 114 engages the contacts 116 nevertheless there is still an unavoidable although small increment of movement of the vehicle with the contact 114 continuing to move to the left beyond the contacts 116 so as to terminate the second signal with the vehicle of course being stopped at this time.

The circuit of FIG. 10 is identical with that of FIG. 9 and operates in the same way. The only difference is that in FIG. 10 a lamp 138 is energized rather than the bell 50. It will be noted that the lamp 138 is connected into the circuit in exactly the same way as the bell 50.

The circuit of FIG. 11 will also operate in precisely the same way as the circuits of FIGS. 9 and 10. The only difference with respect to FIG. 11 is that both the bell 50 and the lamp 138 are connected into the circuit. These signal devices 50 and 138 are connected in parallel with each other with each of the signal devices being connected to the circuit in exactly the same way as illustrated in FIGS. 9 and 10 so that FIG. 11 forms in effect a combination of FIGS. 9 and 10. With the embodiment of FIG. 11 it is possible to provide for the vehicle operator both a visual signal as well as an audible signal so that a particularly safe system of providing signals is afforded with the embodiment of FIG. 11.

It is to be noted that with all of these embodiments when the vehicle is parked it maintains the pair of movable contacts 112 and 114 to the left, as viewed in FIGS. 9–11, beyond the stationary contacts 116. Therefore, when the operator enters the vehicle to back it away from the obstacle the signals will again be given but in the reverse order, and the operator will be advised in this way that the device of the invention is in good operating condition so that when the vehicle is again returned the operator is assured that the device of the invention will operate properly.

The manner in which the device of the invention operates is indicated in FIGS. 4–6. As may be seen from FIG. 4 as the vehicle V approaches the device of the invention the operator will clearly see the emblem 110, although the use of this emblem 110 is optional. It is to be understood that the rod 108 is shown in the drawings schematically at a much shorter length than its actual length. This is for the sake of convenience in the drawings. Actually the indicator 110 is situated at an elevation sufficiently high to be seen without any difficulty by the operator of the vehicle. The positioning means 22 of the device of the invention is situated on the surface S on which the vehicle travels. This positioning means will reliably remain at any location where it is placed because of its weight. Thus, after the operator pours the concrete 26 into the upwardly directed interior space of the container 24, the positioning means 22 will be provided with a sufficiently great weight to remain reliably at whatever location the operator selects on the surface S. Thus the necessity of bolting the device of the invention to a suitable support with adjustments being possible is completely eliminated with the device of the invention. The device of the invention can readily be shifted to any desired location on the surface S, and the device of the invention will remin in the position to which it is shifted. In selecting this position, the operator will situate the device of the invention at a given distance in advance of an obstacle O. This obstacle O which is schematically shown in FIGS. 4–6 can be a wall such as the wall at the inner end of a garage or a column such as is normally encountered in a large underground space or the like beneath a building, for example, where it is customary to park vehicles. Thus, FIG. 4 shows the device of the invention situated at a selected distance in advance of the obstacle O on the surface S on which the vehicle V travels as it approaches the device of the invention.

As soon as the vehicle V engages, with a bumper thereof, for example, the plate 104, the movable means 70 which includes the plate 104 will be swung from the position of FIG. 4 to the dot-dash line position indicated in FIG. 5, and it is in this position that the first signal is given in the manner described above. Thus, as soon as the first signal is given the operator knows that the vehicle must be brought immediately to a stop and applies the brakes to attempt to bring the vehicle immediately to a stop. Of course, the vehicle V continues to move, the first signal is terminated, and the movable means 70 is displaced through the second increment from the dot-dash line position of FIG. 5 to the solid line position of FIG. 5. Thus, the movement from the solid line position of FIG. 4 to the dot-dash line position of FIG. 5 represents the first increment of movement whereas the second increment movement is represented by the movement of the movable means 70 from the dot-dash line position of FIG. 5 to the solid line position of FIG. 5. At this time, namely when the movable means 70 is in the solid line position of FIG. 5, the second signal will be given and the operator knows that the vehicle should already be stopped. However, in practice this has been found to be impossible and there will still be some slight movement with the movable means 70 continuing to move somewhat beyond the solid line position indicated in FIG. 5. The device of the invention is situated in advance of the obstacle O through a distance which will assure that when the vehicle continues to move through a slight distance after the movable means 70 is in the solid line position of FIG. 5, the vehicle V will still be situated in front of the obstacle O without engaging the latter. However, with the device of the invention it is possible to provide a final distance between the obstacle O and the vehicle V which is extremely small while at the same time enabling the operator to prevent in a highly reliable manner any contact between the vehicle and the obstacle O.

It may sometimes happen that the plate 104 will engage the obstacle O. This engagement may occur when the operator is first determining where it is best to position the device of the invention or it may occur at any time if the operator fails to bring the vehicle to a stop at the desired distance in front of the obstacle O. To take care of this situation, the structure of the invention provides a means for preventing damage to the structure of the invention. This damage-preventing means in the illustrated example takes the form of constructing the lever means 70, which forms the movable means of the invention, in such a way that it is capable of becoming automatically elongated in response to engagement of the plate 104 with the obstacle O while vehicle V continues to travel toward the obstacle O.

As was pointed out above, the lever means 70 includes the inner lever 72 on which the outer tubular member 84 is telescopically mounted. Also as was indicated above, when the vehicle engages the plate 104, this plate together with the lever means moves as a unit around the pin 60 since the part 96 prevents counterclockwise turning of the plate 104 with respect to the tubular member 84. However, the U-shaped portion 100 permits the plate 104 to turn in a clockwise direction, as viewed in FIG. 2, around the pin 86 with respect to the outer telescoped member 84.

As may be seen from FIG. 6, when the plate 104 engages with its top edge the obstacle O and the vehicle V continues to move toward the obstacle O, the plate 104 will in fact swing with respect to the outer telescoped member 84 in a clockwise direction, in opposition to the force of the spring 88, and at this time while the flange 102 approaches the obstacle O, the tubular member 84 slides upwardly with respect to the lever 72 for automatically elongating the lever means in a manner apparent from a comparison between the solid and dotted line indications of the lever means 70 in FIG. 6. This capability of automatic elongation of the lever means prevents any damage to the structure. When the vehicle V is backed away from the obstacle O with the parts in the position of FIG. 6, the telescope member 84 will simply fall by gravity downwardly along the lever 72 so that the parts will automatically resume their initial operating condition.

In addition, as was pointed out above, plate 104 is made of a strong rugged plastic which has a certain degree of elasticity although it is fairly rigid, so that some slight bending of the plate 104 can also take place under the conditions shown in FIG. 6. However, the plate 104 will immediately resume its flat condition when the stress is eliminated.

FIG. 7 is an illustration of the pair of screws 124 described above carrying the plastic nuts 136, FIG. 7 also showing the springs 122 which press the balls 116 inwardly toward each other so as to engage first the contact 112 illustrated in FIG. 7 and then the next contact 114.

Figure 7:
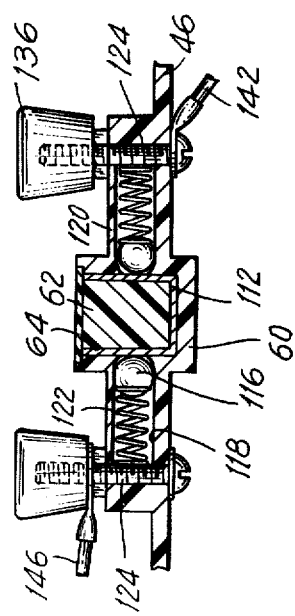
FIG. 7 is a transverse sectional elevation of part of the structure of FIG. 3 taken along line 7—7 of FIG. 3 in the direction of the arrows.

FIG. 7 also shows the cross sectional configuration of the receptacle 60 as well as the plunger 62 and the receptacle cover 64.

As is shown in FIG. 2, the bell 50 has a conductor 142 which extends to one of the screws 124, and this conductor 142 is also indicated in FIG. 7. The remaining conductor 144 of the bell is connected with the screw 128 as described above. The battery 140 has a conductor 146 connected to one of its terminals and connected with the other of the screws 124, as shown in FIG. 7, while a second conductor 148 is connected between the other terminal of the battery 140 and the screw 128. These conductors 146 and 148 are also indicated in FIG. 1 extending between the battery 140 and the device of the invention as described above. The lamp 138 is indicated in phantom lines in FIG. 1 at an elevation suitable for observation by the operator of the vehicle, and this lamp 138 is connected by way of conductors 150 and 152 into the circuit as illustrated in FIGS. 10 and 11.

Figure 8:
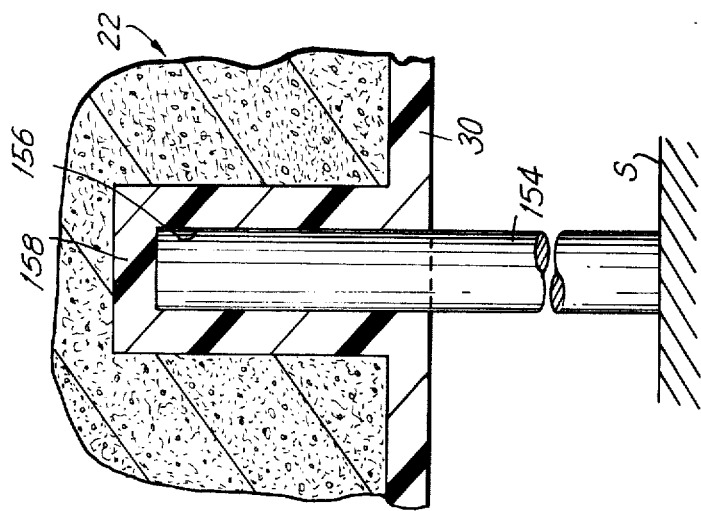
FIG. 8 is a fragmentary sectional elevation of a variation enabling the elevation of the device to be regulated.

Although the structure described above is suitable for most vehicles, certain types of vehicles may be situated at a relatively great distance from the surface on which the vehicle travels. For example, the vehicle with which the structure of the invention is used may be a truck. In order to enable the device of the invention to be used with vehicles of this latter type, a means is operatively connected with the positioning means for situating the latter at a given elevation above the surface S on which the vehicle travels. Thus, as is shown in FIG. 8, the positioning means 22 may rest on a plurality of rods 154 which extend downwardly from the positioning means 22 and engage the surface S on which the vehicle travels. For this purpose the bottom wall 30 of the container 24 is formed with vertically extending recesses 156 situated in the interior of inwardly extending closed tubular portions 158 which are formed integrally with the wall 30 as indicated in FIG. 8. These recesses 156 have a diameter corresponding to the diameter of the rods 154 so that the latter can readily be situated by the recesses 156 as illustrated in FIG. 8. Thus, by way of rods 154 of suitable length it is possible to elevate the entire device to and elevation suitable for engagement of a part of the vehicle, such as a bumper thereof, with the plate 104. Therefore, with the construction of FIG. 8 it is possible for the device of the invention to be used even with trucks or the like where the entire vehicle is situated at a considerable distance above the surface S on which the vehicle travels.

It is to be noted that the above-described structure of the invention can be purchased in a disassembled knocked-down condition where it occupies an extremely small space and is relatively light. The concrete 26 is not initially located in the container 24 as described above. The lever 72 is disassembled from the container 24, to be subsequently assembled therewith in the manner described above. Also the telescope member 84 does not initially receive the lever 72 and the plate 104 is not initially connected to the member 84. All of these components can be connected together in the manner described above without the use of any tools or the like, so that an extremely convenient assembly of the structure of the invention is possible. The bell 50 will normally be included with the purchased device, this bell 50 being initially secured in the cavity shown in FIG. 2 by the manufacturer. However, the purchaser can separately purchase the battery 140 as well as the lamp 138 and the several conductors such as the conductors 146, 148, 150, 152, can either be supplied with the structure of the invention or can be separately purchased. Thus the structure of the invention is extremely convenient to manufacture, ship, and handle until it reaches the destination of the ultimate consumer.

When using a wall outlet as a source of electricity, a suitable transformer will be connected into the circuit.

What is claimed is:

1. A parking compensator, comprising movable means adapted to be situated in the path of movement of a vehicle such as an automobile as the latter approaches an obstacle such as a wall, column, or the like, to be moved by the vehicle, signal means operatively connected with said movable means to be actuated thereby for providing a first signal when said movable means has been moved by the vehicle through a first increment and a second signal when the movable means has been moved by the vehicle through a second increment subsequent to said first increment, so that the operator of the vehicle can be warned by the first signal that the vehicle must be brought to a stop and can attempt to bring the vehicle to a stop in response to the second signal, and positioning means operatively connected with said movable means for positioning the latter with respect to the obstacle for possible movement into direct engagement with the obstacle while being at a distance therefrom which will enable the operator to locate the vehicle close to the obstacle while compensating for the distance through which the vehicle will necessarily continue to move after said signal means provides said second signal.

2. The combination of claim 1 and wherein said movable means has a movable portion visible to the operator of the vehicle.

3. The combination of claim 1 and wherein said positioning means carries said movable means and supports the latter for movement by the vehicle.

4. The combination of claim 3 and wherein said positioning means includes a relatively heavy base adapted to rest on a surface on which the vehicle moves so as to be displaceable with respect to said surface in order to determine the distance of said movable means from the obstacle.

5. The combination of claim 1 and wherein said signal means terminates said first signal before providing said second signal.

6. The combination of claim 3 and wherein said positioning means supports said movable means for swinging movement first through said first increment and then through said second increment.

7. The combination of claim 6 and wherein said movable means includes a plate and a lever means having an upper end portion carrying said plate and swingably supported by said positioning means, said plate and lever means having dimensions for situating said plate in the path of movement of a part of a vehicle such as a bumper thereof when said positioning means rests on a surface on which the vehicle moves.

8. The combination of claim 7 and wherein said lever means includes a means for automatically responding to engagement of the obstacle by said plate for preventing damage to said plate and lever means.

9. The combination of claim 8 and wherein said means for preventing damage includes elongated lever portions which are telescopically slidable one with respect to the other for automatically elongating said lever means if the plate engages the obstacle while the vehicle continues to move toward the same.

10. The combination of claim 3 and wherein said signal means is electrically operable and includes one electrical contact means carried by said positioning means and another electrical contact means automatically responding to movement of said movable means for engaging said one contact means once to provide said first signal and a second time to provide said second signal.

11. The combination of claim 10 and wherein said one contact means includes at least one stationary contact carried by said positioning means and wherein said other contact means includes a pair of mutually spaced contacts which sequentially engage said stationary contact for providing the first and second signals.

12. The combination of claim 11 and wherein said movable means includes a lever swingably carried by said positioning means to be swung with respect thereto, a plunger engaging said lever and supported for movement by said positioning means, spring means maintaining said plunger in engagement with said lever, and said pair of contacts being carried by said plunger and spaced therealong for successively moving into engagement with the stationary contact as the lever turns.

13. The combination of claim 1 and wherein said signal means is carried at least in part by said positioning means.

14. The combination of claim 13 and wherein said signal means includes a bell.

15. The combination of claim 1 and wherein said signal means includes a lamp to be positioned where it can be seen by the operator of the vehicle.

16. The combination of claim 1 and wherein said signal means includes both a bell and a lamp so that said signal means provides signals which can be heard and seen.

17. The combination of claim 1 and wherein said positioning means supports said movable means for movement, and means connected with said positioning means for situating the latter at a given elevation above a surface on which the vehicle moves.

18. The combination of claim 17 and wherein said positioning means is in the form of a relatively heavy unit and said means for situating said positioning means at said elevation including rods of a given length extending downwardly from said positioning means for engaging the surface on which the vehicle travels so that the elevation of said positioning means is determined by the length of the rods.

* * * * *